United States Patent Office.

JOHN T. HAVILAND, OF SAN FRANCISCO, CALIFORNIA.

Letters Patent No. 110,358, dated December 20, 1870.

IMPROVEMENT IN HANDLES FOR CUTLERY, TOOLS, &c.

The Schedule referred to in these Letters Patent and making part of the same.

*To all whom it may concern:*

Be it known that I, JOHN T. HAVILAND, of San Francisco, in the county of San Francisco and State of California, have invented an Improved Material for the Manufacture of Handles for Cutlery, Arms, and Tools; and I do hereby declare that the following description is sufficiently full to enable any person skilled in the art or science to which it most nearly appertains to make and use the same, without further invention or experiment.

The object of my invention is to provide an improved handle for cutlery, arms, and tools; and It consists in the application of porcelain or other baked or burned clay or earthy matter, either of a fusible or non-fusible nature, as a material from which to manufacture said handles.

The earthy matter is first molded to the desired form, and then baked or burned in the usual manner. The handle can be ornamented as desired.

The process of mixing together the various clays and classes of earthy matter, in order to convert them into wares by baking is too well understood to require a further explanation in this connection.

Handles manufactured from the above material will be cheaper than the ordinary bone or ivory handle, but will render equal service, when properly made; besides they will have the advantage of being impervious to water, grease, or other liquid, and will not become discolored by use or time.

Having thus described my invention,

What I claim, and desire to secure by Letters Patent, is—

As a new article of manufacture, a handle for cutlery, arms, and tools, composed of baked or burned clay or earthy matter, substantially as above set forth.

In witness that the above-described invention is claimed by me I have hereunto set my hand and seal.

JOHN T. HAVILAND. [L. S.]

Witnesses:
HENRY A. BENJAMIN,
EDGAR V. THORN.